US010523748B2

(12) United States Patent
Yang et al.

(10) Patent No.: US 10,523,748 B2
(45) Date of Patent: Dec. 31, 2019

(54) MANAGING HEALTH STATUS OF NETWORK DEVICES IN A DISTRIBUTED GLOBAL SERVER LOAD BALANCING SYSTEM

(71) Applicant: A10 NETWORKS, INC., San Jose, CA (US)

(72) Inventors: Yang Yang, San Jose, CA (US); Yichao He, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 83 days.

(21) Appl. No.: 15/853,270

(22) Filed: Dec. 22, 2017

(65) Prior Publication Data

US 2019/0199790 A1    Jun. 27, 2019

(51) Int. Cl.
*H04L 29/08* (2006.01)
*H04L 29/12* (2006.01)

(52) U.S. Cl.
CPC ...... *H04L 67/1029* (2013.01); *H04L 61/1511* (2013.01); *H04L 67/1008* (2013.01); *H04L 67/1036* (2013.01)

(58) Field of Classification Search
None
See application file for complete search history.

(56) References Cited

U.S. PATENT DOCUMENTS

| | | | | |
|---|---|---|---|---|
| 9,130,954 B2 * | 9/2015 | Joshi | | H04L 67/1008 |
| 10,129,105 B2 * | 11/2018 | Cropper | | G06F 9/45558 |
| 2005/0022202 A1 * | 1/2005 | Sannapa Reddy | | G06F 9/505 718/105 |
| 2006/0271655 A1 * | 11/2006 | Yoon | | H04L 67/1008 709/223 |
| 2011/0153938 A1 * | 6/2011 | Verzunov | | G06F 9/5083 711/118 |
| 2013/0132532 A1 * | 5/2013 | Zhang | | H04L 41/0823 709/220 |
| 2014/0143423 A1 * | 5/2014 | Arya | | H04L 47/70 709/226 |
| 2015/0301883 A1 * | 10/2015 | Talla | | H04L 45/245 714/37 |
| 2015/0319233 A1 * | 11/2015 | Lv | | H04L 67/1034 709/224 |
| 2016/0055351 A1 * | 2/2016 | Barnes | | G06F 9/50 726/34 |
| 2018/0098230 A1 * | 4/2018 | Obaidi | | H04W 24/02 |
| 2019/0057114 A1 * | 2/2019 | Mathunny | | G06F 16/27 |

* cited by examiner

*Primary Examiner* — Joshua Joo
(74) *Attorney, Agent, or Firm* — Keith Kline; The Kline Law Firm PC

(57) ABSTRACT

Provided are methods and systems for managing health statuses of servers. The method for managing health statuses of servers in a distributed GSLB system may include receiving, at a GSLB site controller, health statuses of local servers associated with the GSLB site controller. The method may further include exchanging, by the GSLB site controller, the health statuses of the local servers with health statuses of remote servers associated with at least one remote GSLB site controller. The method may further include distributing, by the GSLB site controller, at least a part of the health statuses of the local servers and the remote servers to SLBs associated with the GSLB site controller.

14 Claims, 14 Drawing Sheets

MANAGING HEALTH STATUS OF NETWORK DEVICES IN A DISTRIBUTED GLOBAL SERVER LOAD BALANCING SYSTEM

TECHNICAL FIELD

This disclosure relates generally to data networks and more particularly to managing health status of network devices in a distributed global server load balancing (GSLB) system.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A GSLB system may use a GSLB controller to balance workloads among multiple servers located at different geographical locations. The number of servers that provide network services to networked clients is tremendous. To duly balance workloads among multiple servers, the GSLB controller needs to know the status of each server in order to forward client requests only to the servers that are currently available for processing the client requests.

The servers may periodically report, directly or via server load balancers (SLBs) associated with each of the servers, the server status to the GSLB controller. Additionally, the GSLB controller may prompt the servers, or corresponding SLBs, to provide the server statuses to the GSLB controller. However, because servers include both local and remote servers with regard to a SLB, the GSLB controller may spend a significant amount of resources on checking the server statuses of remote servers that could be needed for load balancing because the servers co-located with the GSLB controller may not provide the optimal choice for serving the client request. Therefore, the GSLB controller may need to know server statuses of servers that are not co-located with the GSLB controller.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The disclosure relates to systems and methods for managing health statuses of servers. According to one embodiment of the disclosure, a system for managing health statuses of servers is provided. The system may include a GSLB site controller and a storage module communicatively coupled to the GSLB site controller. The GSLB site controller may be configured to receive health statuses of local servers associated with the GSLB site controller. The GSLB site controller may be further configured to exchange the health statuses of the local servers with health statuses of remote servers associated with at least one remote GSLB site controller. The GSLB site controller node may be further configured to distribute at least a part of the health statuses of the local servers and the remote servers to SLBs associated with the GSLB site controller. The storage module may be configured to store at least the health statuses.

In another embodiment of the disclosure, a method for managing health statuses of servers in a distributed GSLB system is provided. The method may include receiving, at a GSLB site controller, health statuses of local servers associated with the GSLB site controller. The method may further include exchanging, by the GSLB site controller, the health statuses of the local servers with health statuses of remote servers associated with at least one remote GSLB site controller. The method may further include distributing, by the GSLB site controller, at least a part of the health statuses of the local servers and the remote servers to SLBs associated with the GSLB site controller.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
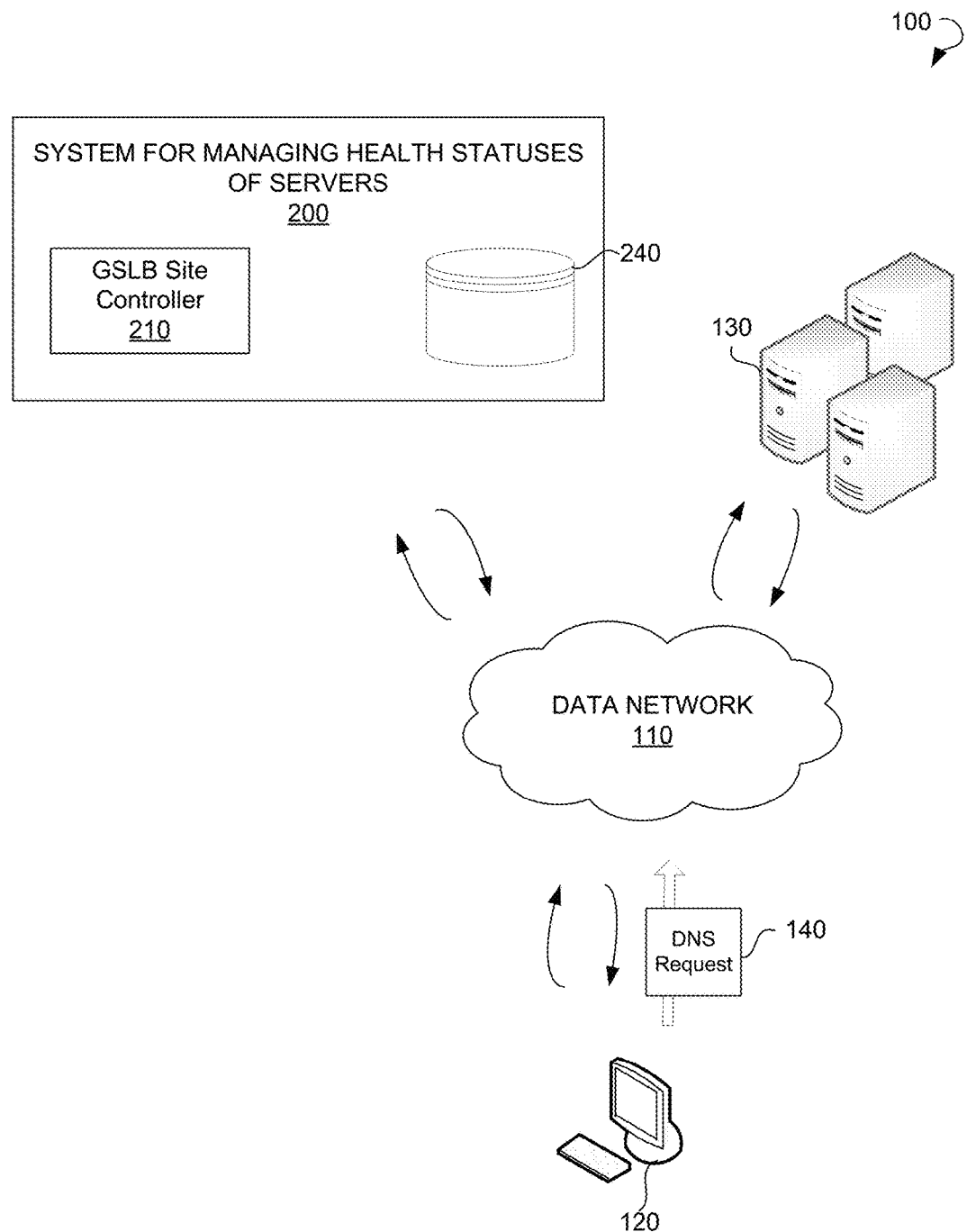
FIG. 1 shows an environment, within which methods and systems for managing health statuses of servers can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

The present disclosure relates to a distributed GSLB system and a method for managing health statuses of servers in the distributed GSLB system. Specifically, the health statuses of servers are hierarchically distributed among GSLB site controllers of the distributed GSLB system. The distributed GSLB system may include a plurality of GSLB site controllers and a plurality of SLBs each in communication with one of the GSLB site controllers.

Each of the SLBs may be associated with one of multiple server pools consisting of a plurality of servers. Each of the SLBs may collect health statuses of the servers in the server pool. The SLBs may provide the collected health statuses to the GSLB site controller.

The GSLB site controller may receive the health statuses from all SLBs associated with the GSLB site. Additionally, the GSLB site controller may be in communication with a remote GSLB site controller. The remote GSLB site controller may have health statuses of servers associated with the remote GSLB site controller. Therefore, the GSLB site controller and the remote GSLB site controller may exchange the health statuses collected by the GSLB site controller with the health statuses of remote servers collected by the remote GSLB site controller.

Upon receiving the health statuses of remote servers from the remote GSLB site controller, the GSLB site controller may distribute the health statuses of the servers collected by the GSLB site controller from all SLBs and the health statuses of remote servers to each of the SLBs. Therefore, in view of such distribution of health statuses by the GSLB site controller, even though each SLB collects only the health statuses of servers associated with this specific SLB, each SLB may have health statuses of all servers associated with the GSLB site controller and servers associated with the remote GSLB site controller.

Referring now to the drawings, FIG. 1 illustrates an environment 100 within which methods and systems for managing health statuses of servers can be implemented. The environment 100 may include a data network 110, a client 120, a system 200 for managing health statuses of servers, and a plurality of servers 130. The client 120 may include a network machine or a network resource that sends a DNS request 140 for initiating a secure session with one of the plurality of servers 130. The client 120 may communicate with one of the plurality of servers 130 using the data network 110.

The data network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network 110 may include a network of data processing nodes that are interconnected for the purpose of data communication.

A GSLB site controller 210 of the system 200 may be responsible for collecting health statuses of the plurality of servers 130. Upon intercepting the DNS request 140, the system 200 may establish a secure session with one of the plurality of servers 130 selected based on the health statuses. The GSLB site controller 210 may be communicatively coupled to a storage module 240 that may store the health statuses of the plurality of servers 130. Managing health statuses of the plurality servers 130 is described in detail with reference to FIGS. 2-13.

Figure 2:
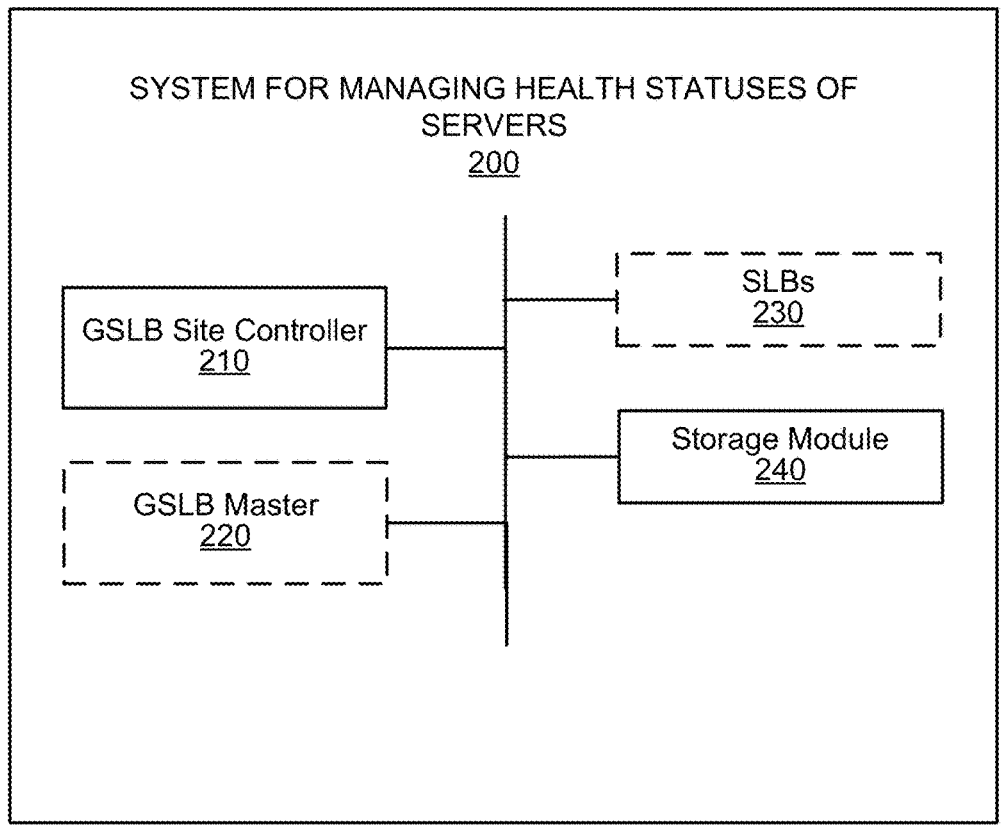
FIG. 2 is a block diagram of a system for managing health statuses of servers, according to an example embodiment.

FIG. 2 is a block diagram representing components of a system 200 for managing health statuses of servers, in accordance with certain embodiments. The system 200 can include a GSLB site controller 210 and a storage module 240. The system 200 may further optionally include a GSLB master 220 and a plurality of SLBs 230.

The GSLB site controller 210 may be configured to receive health statuses of local servers associated with the GSLB site controller 210. The local servers may include servers in communication with the GSLB site controller 210. The GSLB site controller 210 may collect the health statuses based on a predetermined health collection policy. The GSLB site controller 210 may communicate with the local servers directly or via SLBs 230. Specifically, the health statuses may be collected by respective SLBs 230 associated with the GSLB site controller 210. In an example embodiment, the health statuses received by the GSLB site controller 210 may further include a health status of the SLB that collects the health statuses of the local servers.

In a further example embodiment, the health statuses of the local servers may be reported directly to the GSLB site controller 210 by the local servers associated with the GSLB site controller 210. Specifically, the local servers may send the health statuses to the GSLB site controller 210 based on the predetermined health collection policy distributed to each of the local servers.

The GSLB site controller 210 may be further configured to exchange the health statuses of the local servers with health statuses of remote servers associated with at least one remote GSLB site controller. The health statuses of the local servers and the health statuses of the remote servers may include at least one of the following parameters: a central processing unit (CPU) utilization, Hypertext transfer protocol (HTTP) activities, a memory utilization, a disk usage, an application status, a virtual Internet Protocol (VIP) state, a connection load, a number of active backend servers, a session capacity, a session load, active round delay time, and so forth. The active round delay time may include a time period between sending, by one of the SLBs 230 or the GSLB site controller 210, a DNS query to a local DNS server of a client and receiving, by one of the SLBs 230 or the GSLB site controller 210, a DNS response from the local DNS server of the client. The health statuses of the servers may be determined based on server responses to application requests sent by the SLBs 230 to the servers.

In an example embodiment, the health statuses may be determined based on thresholds associated with the parameters of the local servers and the remote servers. For example, a predefined threshold may include 80% of one of a CPU usage, memory usage, disk usage, and the like. Therefore, if one of the CPU usage, memory usage, and disk usage is greater than 80%, the SLB may mark the server as having a 'down' state.

The health statuses may be associated with a health status score determined for each of the health statuses. Specifically, the health status score may be determined based on weights assigned to each of the parameters of the local servers and the remote servers. The health status score may be determined using a weighted summation of the parameters and may include, for example, a number from 1 to 100. In some embodiments, the health status score below a predetermined value may indicate a down status of one of the servers.

In an example embodiment, the health statuses are exchanged between the GSLB site controller 210 and the remote GSLB site controllers via the GSLB master 220. Specifically, the GSLB site controller 210 may provide the health statuses to the GSLB master 220. Similarly, each of the remote GSLB site controllers may provide health statuses collected by each of the remote GSLB site controllers to the GSLB master 220. The GSLB master 220 may send the health statuses received from the remote GSLB site controllers to the GSLB site controller 210. Additionally, the GSLB master 220 may send the health statuses received from the GSLB site controller 210 to the remote GSLB site controllers. In an example embodiment, the health statuses exchanged among the GSLB site controller 210 and the remote GSLB site controllers further include a health status of the GSLB site controller 210 provided by the GSLB site controller 210 and a health status of the remote GSLB site controllers provided by each of the remote GSLB site controllers. In an example embodiment, the health status of the GSLB site controller 210 and the health status of the remote GSLB site controllers may include session information that may need to be distributed among SLBs 230 associated with the GSLB site controller 210 or SLBs associated with each of the remote GSLB site controllers, respectively.

The GSLB site controller 210 may be further configured to distribute at least a part of the health statuses of the local servers and the remote servers to SLBs 230 associated with the GSLB site controller 210. The GSLB site controller 210 may store the health statuses in the storage module 240.

In an example embodiment, the GSLB site controller 210 may receive a DNS request. The DNS request may be received from a client. Upon receipt of the DNS request, the GSLB site controller 210 may determine one or more candidate servers to answer the DNS request based on predetermined selection criteria. The one or more candidate servers may be selected from the local servers and the remote servers. The GSLB site controller 210 may select a server from the one or more candidate servers to serve a DNS answer, also referred to herein as a DNS response, to the DNS request. The selection of the server may be made based on the health statuses of the one or more candidate servers distributed to the SLBs.

In an example embodiment, based on the DNS request, the GSLB site controller 210 may select, based on predetermined criteria, four addresses to be returned in the DNS response to the client: an address of an SLB associated with the GSLB site controller 210, address of an SLB associated with a remote GSLB site controller, an address of a first server associated with a further remote GSLB site controller, and an address of a second server associated with the further remote GSLB site controller. The GSLB site controller may have all information related to health statuses of the SLB associated with the GSLB site controller, the SLB associated with the remote GSLB site controller, and the first server and the second server associated with the further remote GSLB site controller. If the SLB associated with the remote GSLB site controller and the second server are in a 'down' status, the GSLB site controller may return only two addresses in the DNS response, namely the address of the SLB associated with the GSLB site controller 210 and the address of the first server associated with the further remote GSLB site controller. The SLB associated with the GSLB site controller 210 may know an address of the first server associated with the further remote GSLB site controller and may forward the DNS request to the first server associated with the further remote GSLB site controller.

Figure 3:
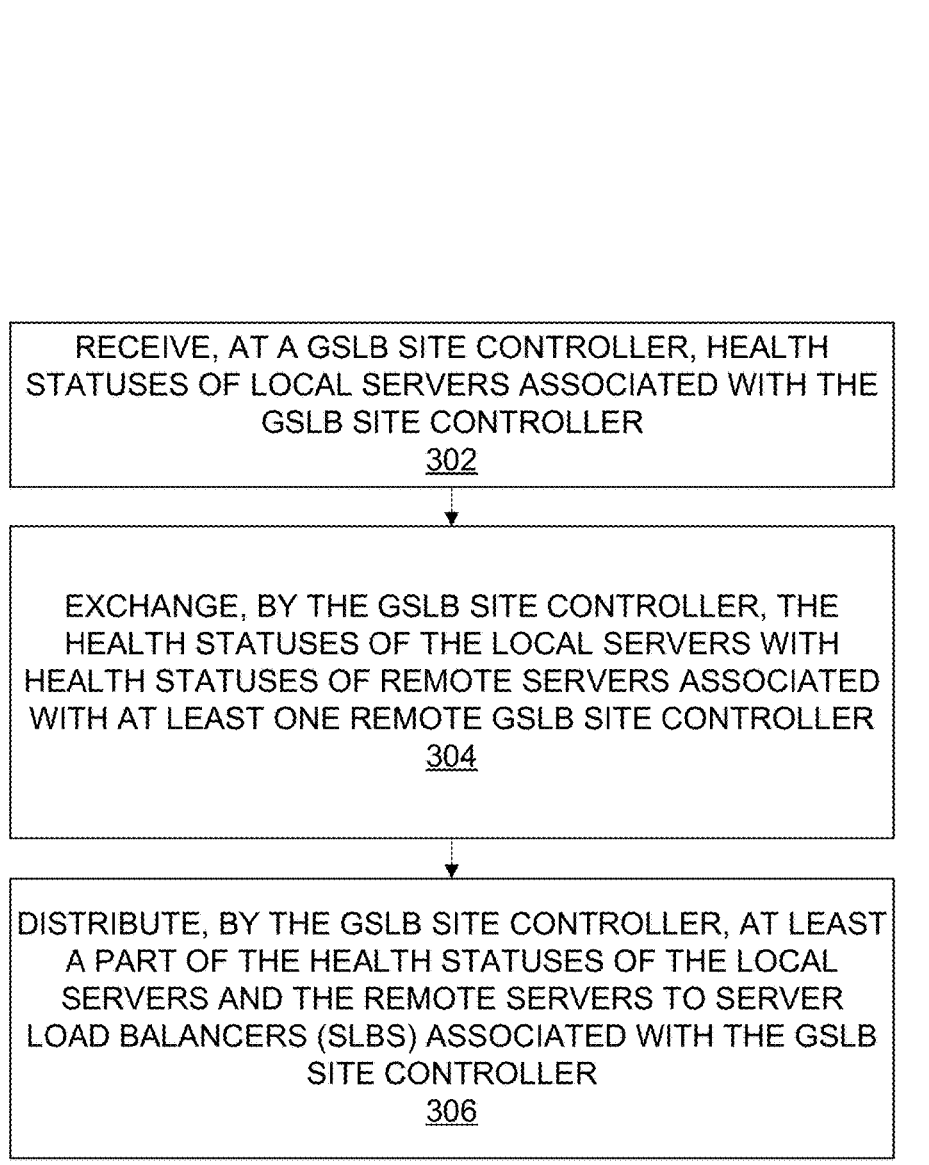
FIG. 3 is a process flow diagram showing a method for managing health statuses of servers in a distributed GSLB system, according to an example embodiment.

FIG. 3 is a flow diagram showing operations of a method 300 for managing health statuses of servers in a distributed GSLB system, according to an example embodiment. In some embodiments, the steps may be combined, performed in parallel, or performed in a different order. The method 300 may also include additional or fewer steps than those illustrated.

The method 300 can commence with receiving, at a GSLB site controller, health statuses of local servers associated with the GSLB site controller at operation 302. At operation 304, the GSLB site controller may exchange the health statuses of the local servers with health statuses of remote servers associated with at least one remote GSLB site controller. Specifically, the health statuses may be exchanged via a GSLB master. The health statuses may be collected by respective SLBs associated with the GSLB site controller based on a predetermined health collection policy. In an example embodiment, the health statuses further may include a health status of one of the SLBs or a health status of the GSLB site controller.

The method 300 may further include distributing, by the GSLB site controller, at least a part of the health statuses of the local servers and the remote servers to the SLBs associated with the GSLB site controller at operation 306. Specifically, the GSLB site controller may send, to each of the SLBs, the health statuses of the local servers collected by other SLBs associated with the GSLB site controller and the health statuses of the remote servers collected by the remote GSLB site controller.

Figure 4:
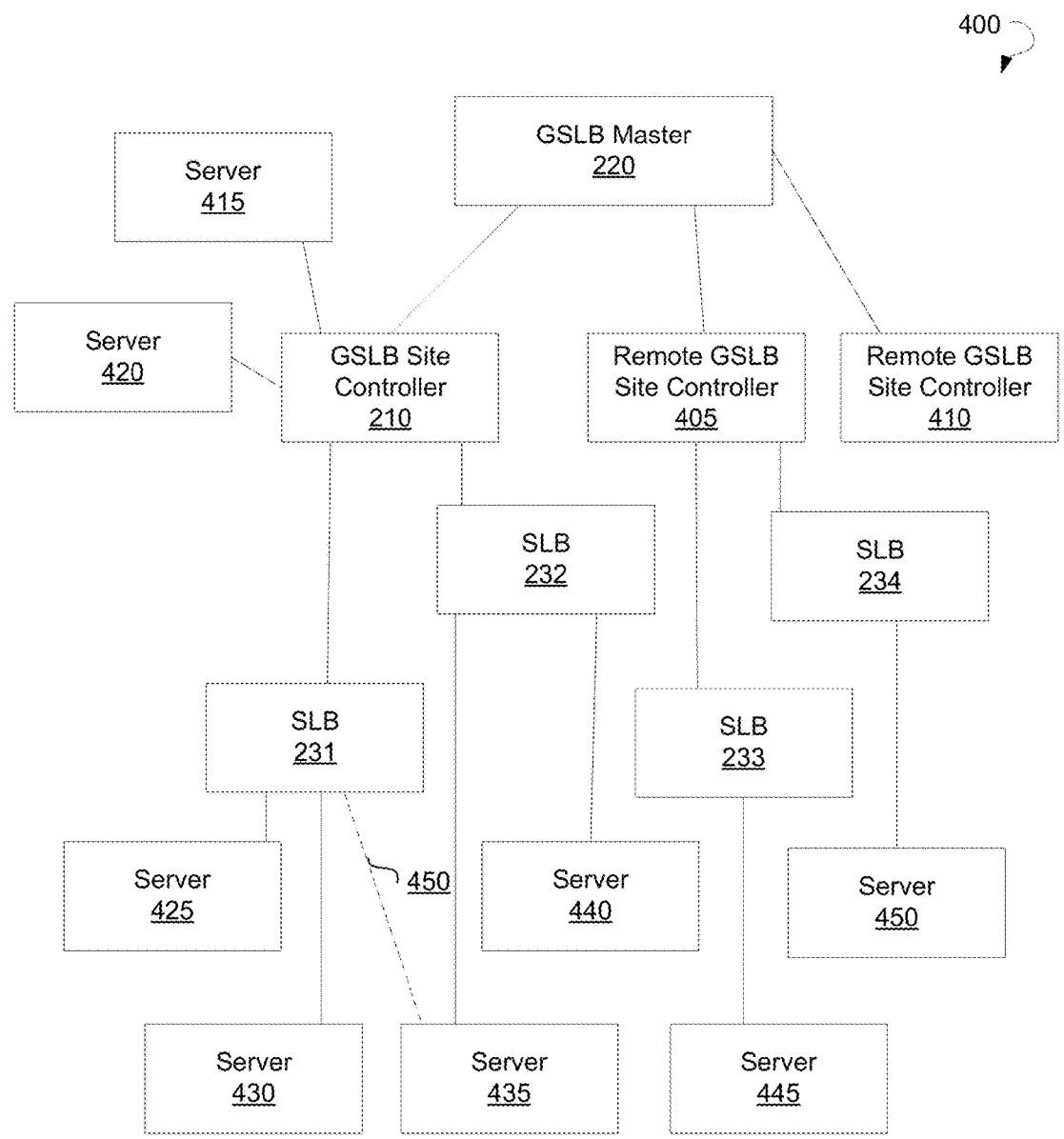
FIG. 4 is a block diagram showing communications between components of a system for managing health statuses of servers, according to an example embodiment.

FIG. 4 shows a block diagram 400 illustrating communications between the components of a system 200 for managing health statuses of servers shown on FIG. 2, according to an example embodiment. A GSLB site controller 210 and plurality of remote GSLB site controllers shown as a remote GSLB site controller 405 and a remote GSLB site controller 410 may be in communication with a GSLB master 220. The GSLB site controller 210 may further be in communication with a plurality of SBLs, such as ab SLB 231 and an SLB 232. The GSLB site controller 210 may further be in communication with a plurality of local servers. The GSLB site controller 210 may communicate with some of local servers, such as a server 415 and server 420, directly. Additionally, the GSLB site controller 210 may communicate with some of local servers via the SLB 231 and the SLB 232. The SLB 231 may be connected to a server pool represented by a server 425 and a server 430. The SLB 232 may be connected to a server pool represented by a server 435 and a server 440. Each of the SLB 231 and the SLB 232 may collect health statuses of servers of the respective server pool. Specifically, the SLB 231 may collect health statuses of the server 425 and the server 430, and the SLB 232 may collect health statuses of the server 435 and the server 440. The SLB 231 and the SLB 232 may send the collected health statuses to the GSLB site controller 210.

The GSLB site controller 210 may further directly collect the health statuses from the server 415 and server 420. Similar to the GSLB site controller 210, the remote GSLB site controller 405 may be in communication with an SLB 233 and an SLB 234. The SLB 233 may collect the health status from a server 445, and the SLB 234 may collect the health status from a server 450. The SLB 233 and the SLB 234 may send the collected health statuses to the remote GSLB site controller 405.

Each of the GSLB site controller 210, the remote GSLB site controller 405, and the remote GSLB site controller 410 may send the collected health statuses as well as their own health statuses, i.e., the health status of the GSLB site controller 210, the health status of the remote GSLB site controller 405, and the health status of the remote GSLB site controller 410, to the GSLB master 220. Upon receipt of the health statuses, the GSLB master 220 may send the health statuses received from the remote GSLB site controller 405 and the remote GSLB site controller 410 to the GSLB site controller 210, send the health statuses collected by the GSLB site controller 210 to each of the remote GSLB site controller 405 and the remote GSLB site controller 410, and send the health statuses collected by the remote GSLB site controller 405 to the remote GSLB site controller 410 and vise versa.

Upon receipt of the health statuses from the GSLB master 220, the GSLB site controller 210 may send the received health statuses to the SLB 231 and the SLB 232. In an example embodiment, the GSLB site controller 210 may send the health statuses of servers associated with the SLB 232 to the SLB 231 and may send the health statuses of servers associated with the SLB 231 to the SLB 232. Additionally, the GSLB site controller 210 may send the health statuses of servers associated with the SLB 233 and SLB 234 to each of the SLB 232 and the SLB 231.

In a further example embodiment, the GSLB site controller 210 may send the same set of health statuses to each of the SLB 231 and the SLB 232. The set of health statuses may contain the health statuses of servers associated with the SLB 231, the health statuses of servers associated with the SLB 232, and the health statuses of servers associated with the SLB 233 and SLB 234 related to the remote GSLB site controller 405.

Therefore, based on such distribution of the health statuses, each of SLBs 231, 232, 233, and 234 may know health statuses of all servers in communication with the GSLB site controller 210 and all servers in communication with the remote GSLB site controller 405 and the remote GSLB site controller 410. As can be seen on FIG. 4, a connection line 450 shows that the SLB 231 may know the health status of the server 435 that belongs to the server pool of the SLB 232.

Figure 5:
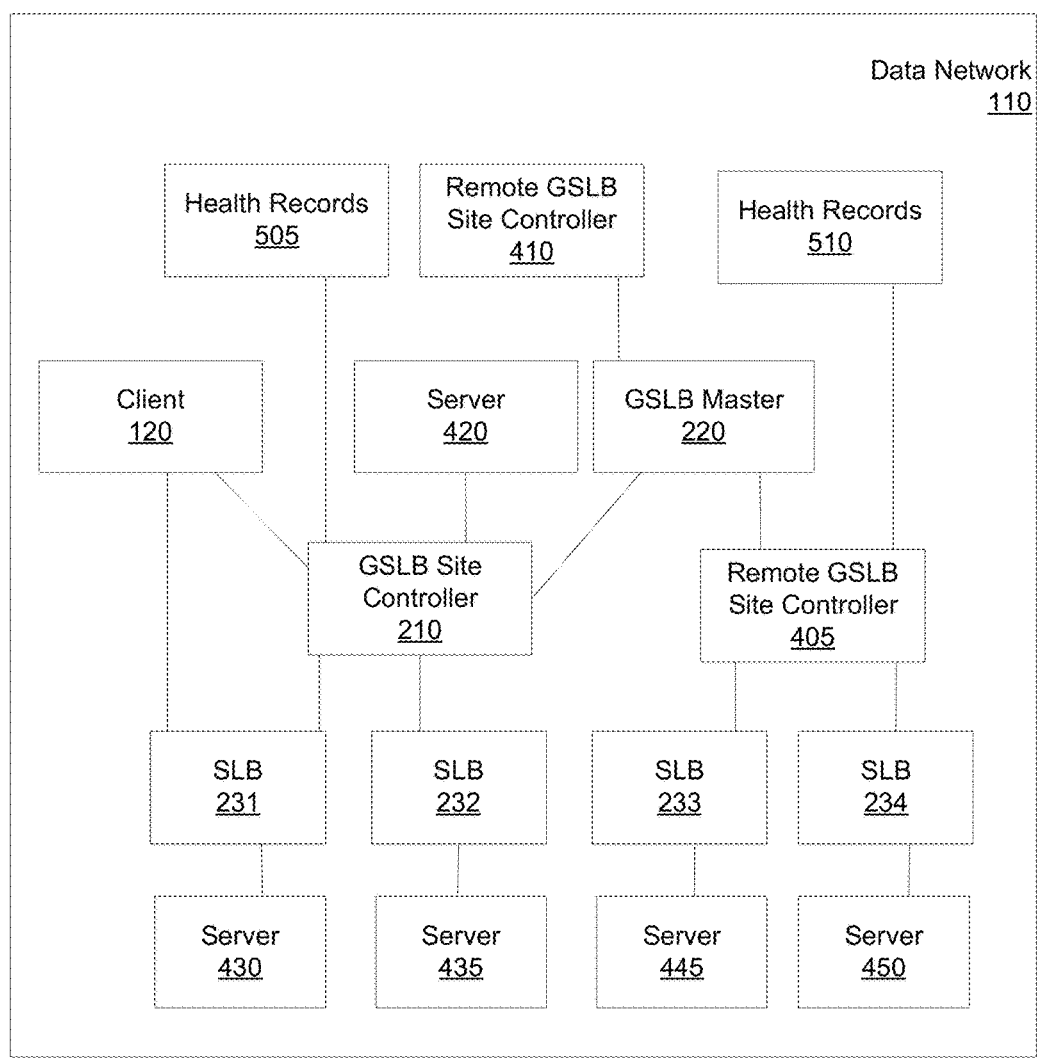
FIG. 5 is a block diagram that shows collecting of health statuses of servers by GSLB site controllers and storing the collected health statuses into health records, according to an example embodiment.

FIG. 5 is a block diagram 500 illustrating collecting of health statuses of servers by GSLB site controllers and storing the collected health statuses into health records, according to an example embodiment. An SLB 231 may collect a health status from a server 430. Similarly, an SLB 232 may collect a health status from a server 435. The GSLB site controller 210 may receive health statuses of the server 430 and the server 435 from the SLB 231 and the SLB 232, respectively. Additionally, the GSLB site controller 210 may directly collect a health status from a server 420 in communication with the GSLB site controller 210. The GSLB site controller 210 may store the received health statuses to health records 505. The health records 505 may be stored in a storage module 240 shown on FIG. 2. Additionally, the GSLB site controller 210 may send the received health statuses to the GSLB master 220.

The SLB 233 may collect a health status from a server 445. Similarly, the SLB 234 may collect a health status from a server 450. The remote GSLB site controller 405 may receive health statuses of the server 445 and the server 450 from the SLB 233 and the SLB 234, respectively. The remote GSLB site controller 405 may store the received health statuses to health records 510. Additionally, the remote GSLB site controller 405 may send the received health statuses to the GSLB master 220.

The GSLB master 220 may send the health statuses received from the remote GSLB site controller 405 to the GSLB site controller 210. Upon receipt of the health statuses of the servers 445 and 450 associated with the remote GSLB site controller 405, the GSLB site controller 210 may store the health statuses of the servers 445 and 450 to the health records 505.

Similarly, the GSLB master 220 may send the health statuses received from the GSLB site controller 210 to the remote GSLB site controller 405. Upon receipt of the health statuses of the servers 430 and 435 associated with the GSLB site controller 210, the remote GSLB site controller 405 may store the health statuses of the servers 430 and 435 to the health records 510.

The GSLB site controller 210 may receive a DNS request from a client 120. Upon receipt of the DNS request, the GSLB site controller 210 may analyze the health statuses of servers 420, 430, 435, 445, and 450 stored in the health records 505 and select one of servers 420, 430, 435, 445, and 450 for serving the DNS request of the client 120. The selection may be made based on predetermined criteria. For example, the GSLB site controller 210 may select the server 430. Upon selection of the server 430, the GSLB site controller 210 may send the DNS request of the client 120 to the SLB 231 associated with the selected server 430. In an example embodiment, based on the receipt of the DNS request of the client 120 from the GSLB site controller 210, the SLB 231 may establish a communication with the client 120. Therefore, the client 120 may communicate with the server 231 via the SLB 231. The SLB 231 may receive data packets sent by the server 430 to the client 120 and may send the data packets sent by the server 430 to the client 120.

In a further example embodiment, the client 120 may communicate with the server 231 via the GSLB site controller 210 and the SLB 231. The GSLB site controller 210 may forward all data packets sent by the client 120 to the SLB 231 associated with the selected server 430. The SLB 231 may receive data packets sent by the server 430 to the client 120 and may send the data packets sent by the server 430 to the GSLB site controller 210 for further forwarding to the client 120.

Figure 6:
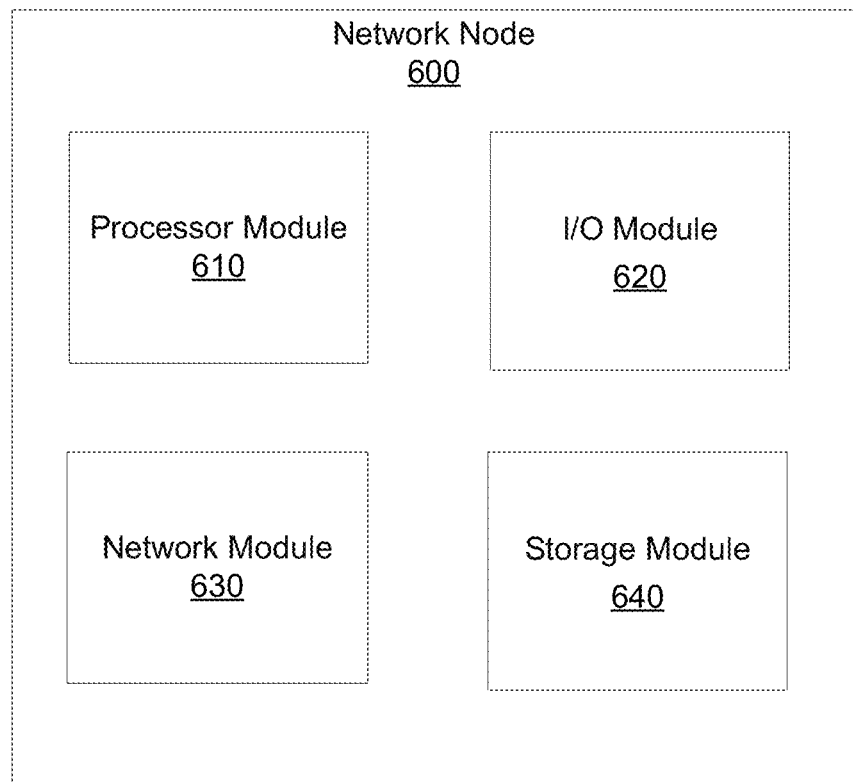
FIG. 6 is a block diagram showing components of a network node, according to an example embodiment.

FIG. 6 is a block diagram illustrating a network node, according to an example embodiment. A network node 600 may include a network computer and may be a GSLB site controller, a remote GSLB site controller, an SLB, a client, or a server. In an example embodiment, the network node 600 may include a processor module 610, an input/output (I/O) module 620, a network module 630, and a storage module 640. In an example embodiment, the processor module 610 may include one or more processors which may be a micro-processor, an Intel processor, an Advanced Micro Devices processor, a Microprocessor without Interlocked Pipeline Stages processor, an ARM (advanced RISC machine)-based processor, or a Reduced Instruction Set Computer processor. In an example embodiment, the processor module 610 may include one or more processor cores embedded in a processor. In further example embodiments, the processor module 610 may include one or more embedded processors, or embedded processing elements in a Field Programmable Gate Array, an ASIC, or Digital Signal Processor.

In an example embodiment, the network module 630 may include a network interface, such as Ethernet, optical network interface, a wireless network interface, T1/T3 interface, a WAN or LAN interface. In a further example embodiment, the network module 630 may include a network processor. In an example embodiment, the storage module 640 may include Random Access Memory (RAM), Dynamic RAM, Static RAM, Synchronous Dynamic RAM, or memory utilized by the processor module 610 or the network module 630. In an example embodiment, the storage module 640 may store data utilized by the processor module 610. In an example embodiment, the storage module 640 may include a hard disk drive, a solid-state drive, an external disk, a digital versatile disc, a compact disk, or a readable external disk. The storage module 640 may store one or more computer programming instructions which when executed by the processor module 610 or network module 630 can implement one or more of the functionality of the methods and systems for managing health statuses of servers described herein. In an example embodiment, the storage module 640 may include a storage module 240 shown on FIG. 2

In an example embodiment, the I/O module 620 may include a keyboard, a keypad, a mouse, a gesture based input sensor, a microphone, a physical or sensory input peripheral, a display, a speaker, a physical or sensual output peripheral, or any other input or output module.

Referring again to FIG. 5, the client 120 may be a network node 600 as illustrated in FIG. 6 and may be connected to data network 110. The client 120 can include a personal computer, a laptop computer, a tablet, a smartphone, a mobile phone, an Internet phone, a netbook, a home gateway, a broadband gateway, a network appliance, a set top box, a media server, a personal media player, an access gateway, a networking switch, a server computer, a network storage computer, or any computing device comprising at least a network module and a processor module.

In an example embodiment, each of servers 420, 430, 435, 445, and 450 may be the network node 600 connected to the data network 110. The server may serve the DNS request requested indirectly by the client 120 via the GSLB site controller 210.

In an example embodiment, the GSLB site controller 210 may be network node 600 and may include one or more of functionality of a firewall, a secure sockets layer proxy gateway, a transmission control protocol proxy gateway, a server load balancer, an application delivery controller, a threat protection system, a secure traffic manager, a legal interception gateway, or a VPN gateway. In further example embodiments, the GSLB site controller 210 may include one or more hardware security modules such as a hardware-based cryptographic module or a hardware-based encryption engine.

Figure 7:
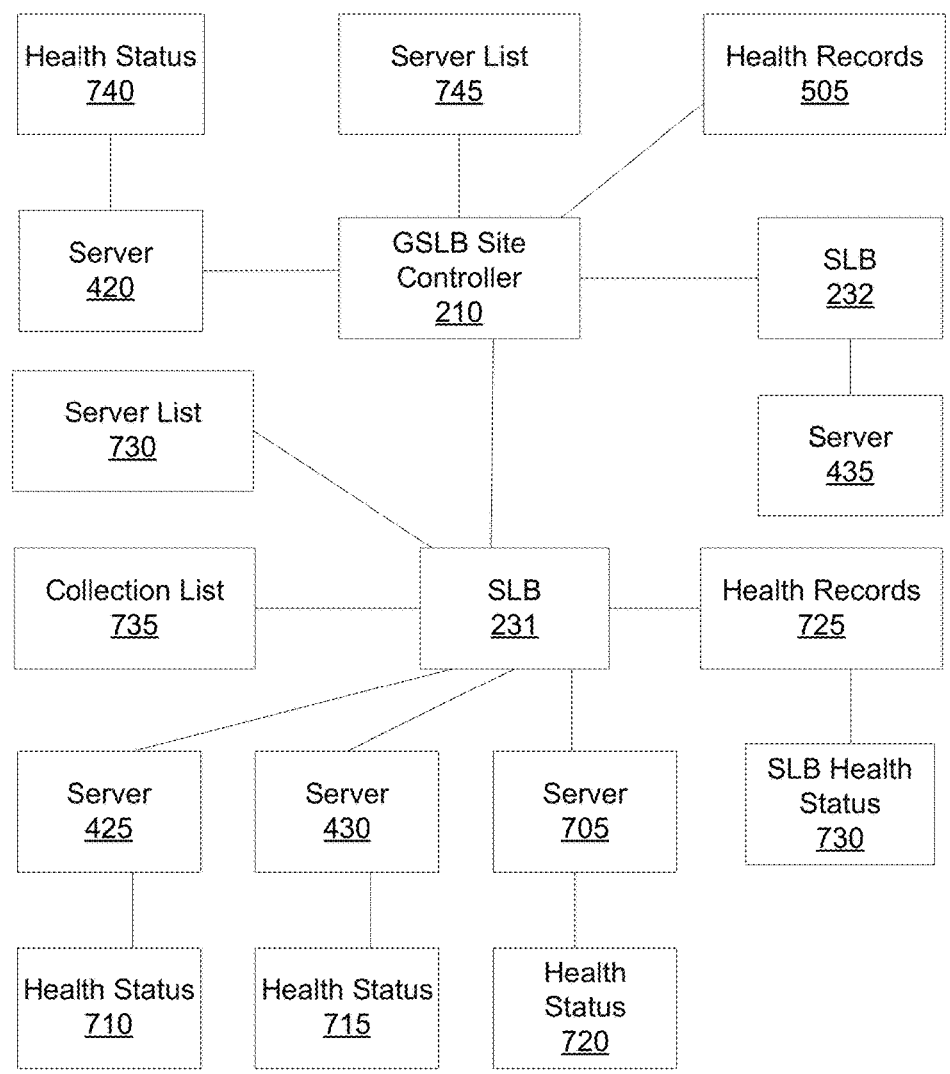
FIG. 7 is a block diagram that shows collecting of health statuses of servers and SLBs by GSLB site controllers and storing the collected health statuses into health records, according to an example embodiment.

FIG. 7 is a block diagram 700 illustrating collecting of health statuses of servers and SLBs by GSLB site controllers and storing the collected health statuses into health records, according to an example embodiment. The SLB 231 may be handle data communications associated with the server 425, server 430, and server 705. The server 425 may send a health status 710 to the SLB 231. Similarly, each of the server 430 and server 705 may send a health status 715 and a health status 720, respectively, to the SLB 231. The SLB 231 may store the received health statuses 710, 715, and 720 to health records 725. Additionally, the SLB 231 may store a health status of the SLB 231 shown as SLB health status 730 to the health records 725.

The SLB 231 may have a server list in which all servers associated with the SLB 231, such as the server 425, server 430, and server 705, may be included. In an example embodiment, the SLB 231 may group servers 425, 430, and 705 into collections based on predetermined criteria. The SLB 231 may store the collections of servers into a collection list 735. The SLB 231 may instruct, based on a predetermined health collection policy, all servers of the server list 730 to periodically send health statuses to the SLB 231. In a further example embodiment, the SLB 231 may periodically request health statuses from the servers of the server list 730. In an example embodiment, the SLB 231 may have a health monitor (not shown) configured to periodically send an application request to the servers 425, 430, and 705 to check the health status 710, 715, and 720, respectively. If one of the servers 425, 430, and 705 fails to respond to the application request, i.e., is in 'down' state, such one of the servers 425, 430, and 705 cannot be selected for serving a request of a client. The SLB 231 may send all health statuses stored by the SLB 231 in the health records 725 to the GSLB site controller 210.

The GSLB site controller 210 may receive the health statuses 710, 715, and 720 of servers 425, 430, and 705 and the SLB health status 730 from the SLB 231 and store all received health statuses to the health records 505. The GSLB site controller 210 may also receive a health status of server 435 from the SLB 232 and store the received health status to the health records 505. Additionally, the GSLB site controller 210 may directly collect a health status 740 of the server 420 and store the health status 740 to the health records 505. The GSLB site controller 210 may also have a server list 745 in which all servers associated with the GSLB site controller 210, the SLB 231, and the SLB 232 may be listed. The GSLB site controller 210 may periodically request, directly or via the SLBs 231 and 232, the servers of the server list 745 to provide the health statuses.

Figure 8A:
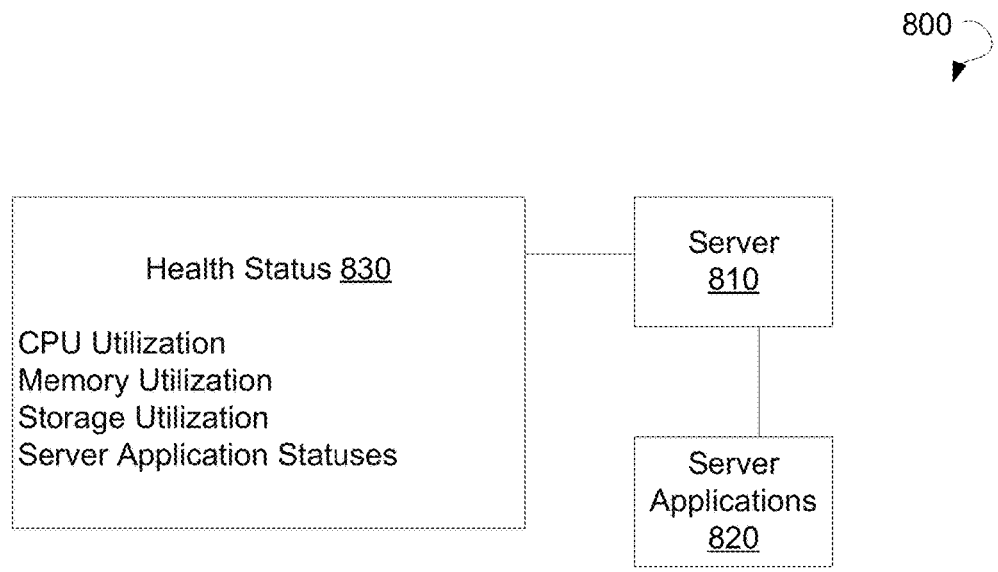
FIG. 8A is a block diagram showing a health status of a server, according to an example embodiment.

FIG. 8A is a block diagram 800 illustrating a health status of a server, according to an example embodiment. A server 810 may be associated with one or more server applications 820. The server 810 may include one of servers 420, 425, 430, 705, 435 shown on FIG. 7. A health status 830 of the server 810 may include one or more of the following parameters: a CPU utilization of the server 810, a memory utilization of the server 810, a storage utilization of the server 810, server application statuses of server applications 820, and so forth. The server 810 may send the server status 830 to an SLB associated with the server 810 or to a GSLB site controller (if the server 810 communicates directly with the GSLB site controller, such as the server 420 shown on FIG. 7). In an example embodiment, to obtain a server application status, the SLB may send an application request to the server 810. The application request may include one or more of the following: an HTTP request, a DNS request, a session initiation protocol request, a database request, and so forth.

Figure 8B:
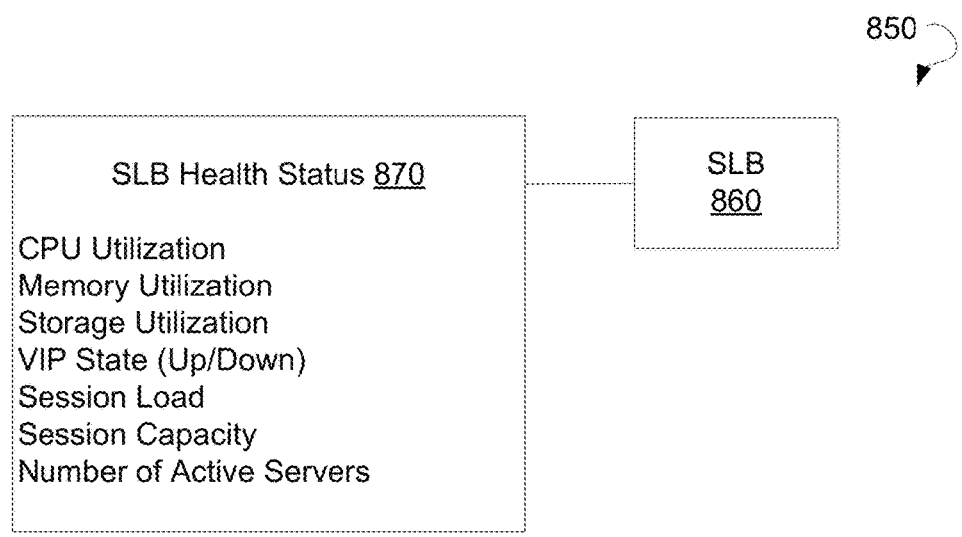
FIG. 8B is a block diagram illustrating an SLB health status, according to an example embodiment.

FIG. 8B is a block diagram 850 illustrating an SLB health status of an SLB, according to an example embodiment. An SLB 860 may have an SLB health status 870. The SLB health status may include one or more of the following parameters: a CPU utilization of the SLB 860, a memory utilization of the SLB 860, a storage utilization of the SLB 860, a VIP state (up/down), a session load, a session capacity, a connection load, an active round delay time, a number of active servers associated with the SLB 860, and so forth. The server 810 may send the server status 830 to an SLB associated with the server 810. The SLB 860 may send the server status 830 and the SLB health status 870 to the GSLB site controller associated with the SLB 860.

Figure 9:
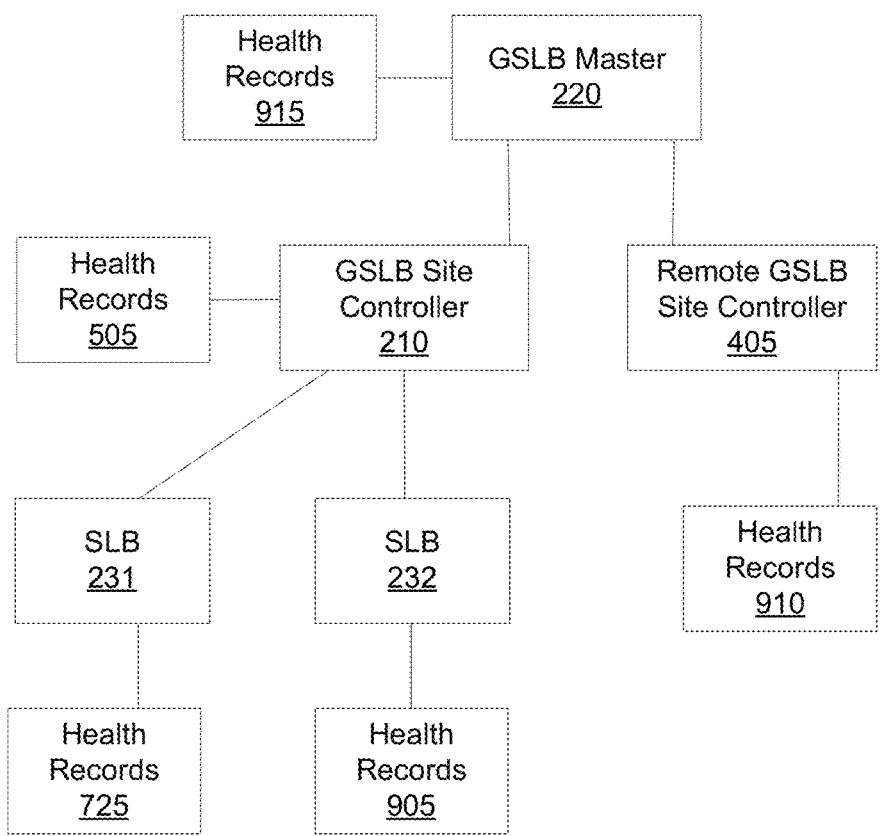
FIG. 9 is a block diagram that shows sending of health statuses to a GSLB master and storing of the health statuses to health records by the GSLB master, according to an example embodiment.

FIG. 9 is a block diagram 900 that illustrates sending of health statuses to a GSLB master and storing of the health statuses to health records by the GSLB master, according to an example embodiment. The SLB 231 may send health statuses stored in the health records 725 of the SLB 231 to the GSLB site controller 210. The health statuses sent by the SLB 231 may include health statuses of servers associated with the SLB 231. The SLB 232 may send health statuses stored in the health records 905 of the SLB 232 to the GSLB site controller 210. The health statuses sent by the SLB 232 may include health statuses of servers associated with the SLB 232. In an example embodiment, the SLB 231 sends the health statuses in the form of the health records 725 and the SLB 232 sends the health statuses in the form of the health records 910.

The GSLB site controller 210 may store the received health statuses, or the received health records 725 and health records 910, in the health records 505 of the GSLB site controller 210. A remote GSLB site controller 405 may store all health statuses received from SLBs (not shown) associated with the remote GSLB site controller 405 in health records.

The GSLB site controller 210 may send the health records 505 to the GSLB master 220. Similarly, the remote GSLB site controller 405 may send the health records 910 to the GSLB master 220. Upon receipt of the health records 505 and the health records 910, the GSLB master 220 may store the received health records 505 and health records 910 in health records 915.

Figure 10:
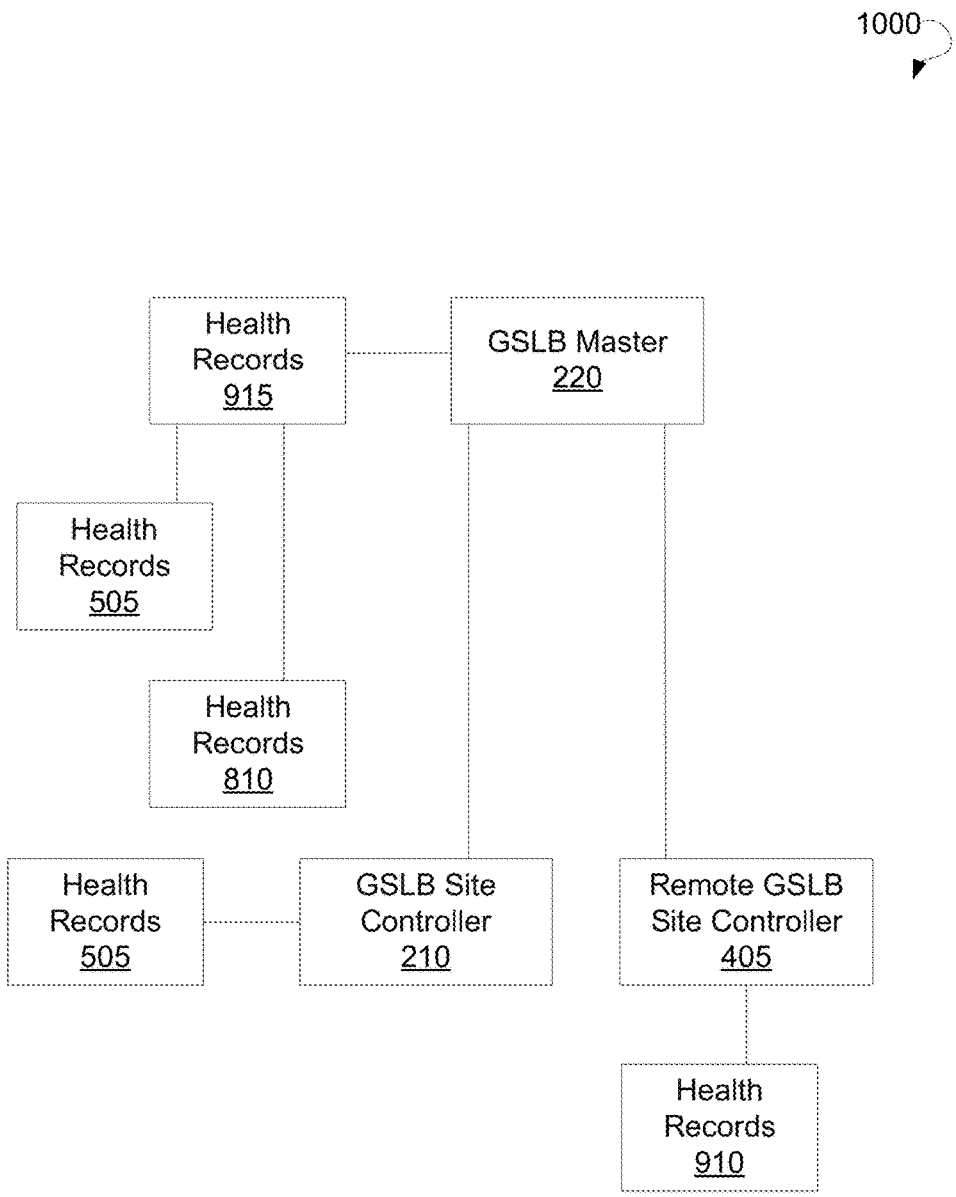
FIG. 10 is a block diagram that shows storing of health records by a GSLB master, according to an example embodiment.

FIG. 10 is a block diagram 1000 that illustrates storing of health records by a GSLB master, according to an example embodiment. The GSLB controller 210 may send the health records 505 to the GSLB master 220. The health records 505 sent by the GSLB controller 210 may include health statuses of servers associated with the GSLB controller 210. The remote GSLB site controller 405 may send the health records 910 to the GSLB master 220. The health records 910 sent by the remote GSLB controller 405 may include health statuses of servers associated with the remote GSLB controller 405. Upon receipt of the health records 505 from the GSLB controller 210 and the health records 910 from by the remote GSLB controller 405, the GSLB master 220 may store the received health records 505 and health records 910 to the health records 915 of the GSLB master 220.

Figure 11:
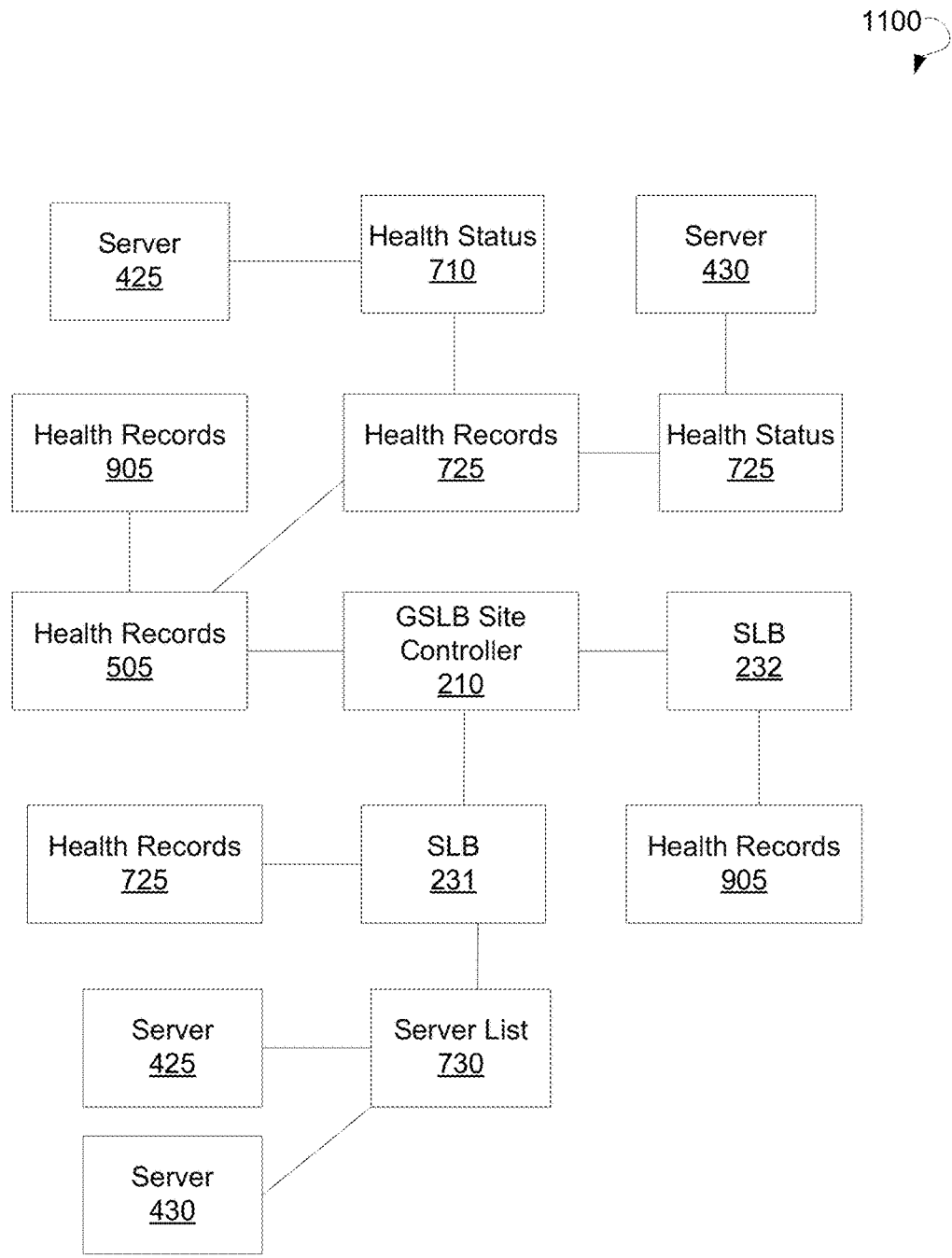
FIG. 11 is a block diagram that shows storing of health statuses in health records by a GSLB controller, according to an example embodiment.

FIG. 11 is a block diagram 1100 that illustrates storing of health statuses in health records by a GSLB controller, according to an example embodiment. The SLB 231 may send health records 725 to the GSLB controller 210. The health records 725 may include health statuses of servers 425 and 430 present in a server list 730 of the SLB 231. Similarly, the SLB 232 may send health records 905 to the GSLB controller 210. The health records 905 may include health statuses of servers associated with the SLB 232. Upon receipt of the health records 905 and health records 725, the GSLB controller 210 may store the received health records 905 and health records 725 in the health records 505 of the GSLB controller 210. As shown on FIG. 11, the health records 505 may contain separately stored health records 905 and health records 725. The health records 725 may contain a health status 710 of the server 425 and the health status 725 of the server 430.

Figure 12:
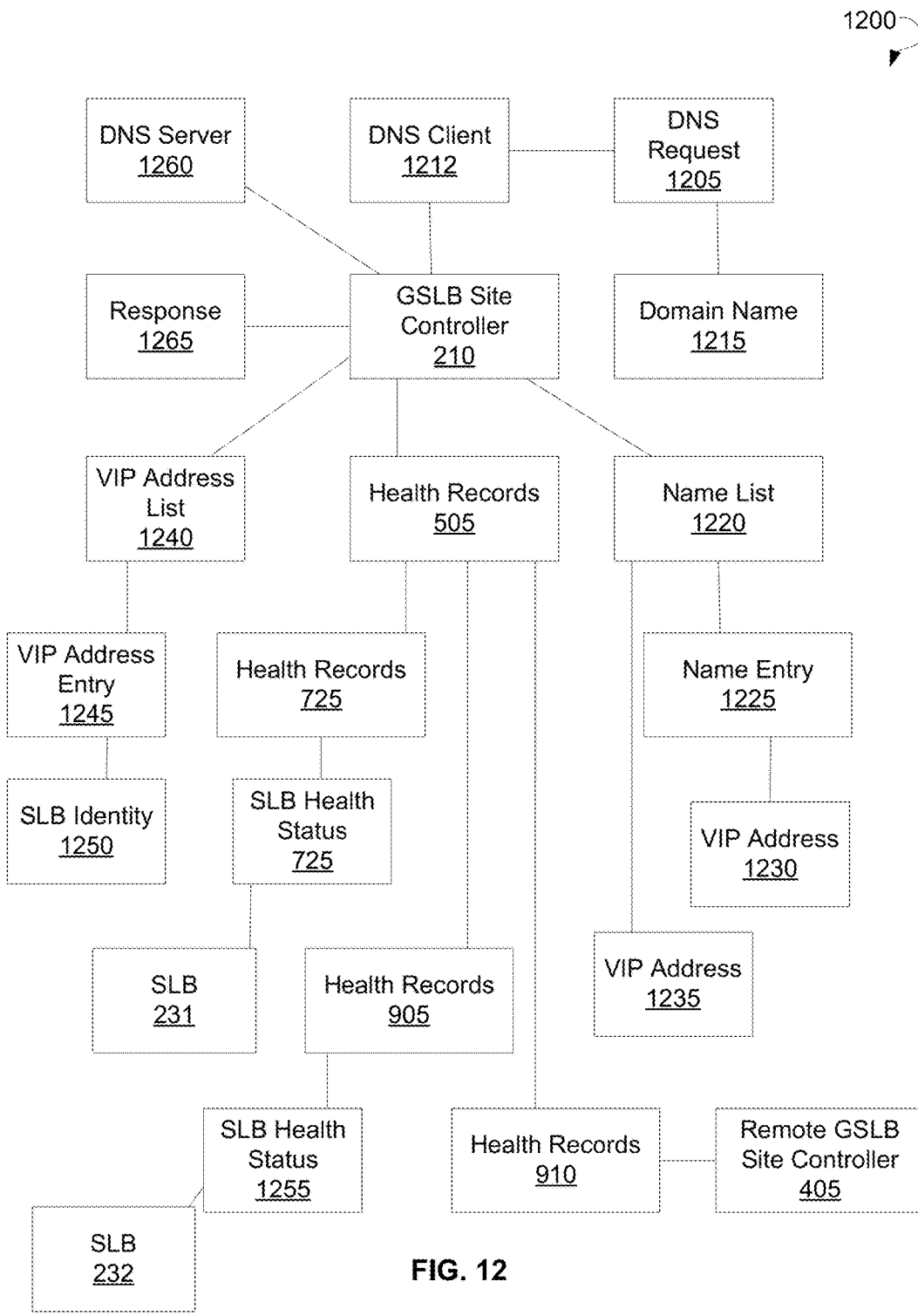
FIG. 12 is a block diagram that shows responding to a domain name system (DNS) response by a GSLB site controller, according to an example embodiment.

FIG. 12 is a block diagram 1200 that illustrates responding to a DNS response by a GSLB site controller, according to an example embodiment. The GSLB site controller 210 may receive a DNS request 1205 from a DNS client 1212. The DNS request 1205 may be sent by a client (not shown), in particular, by the DNS client 1212 associated with the client. The DNS request 1205 may include a domain name 1215 to which the client requests to connect.

The GSLB site controller 210 may have a name list 1220. The name list 1220 may have a plurality of name entries 1225 that may store VIP addresses 1230 of a plurality of servers. In an example embodiment, VIP addresses 1235 may be stored in the name list 1220 and not in name entries 1225.

The GSLB site controller 210 may further have a VIP address list 1240. The VIP address list 1240 may have a plurality of VIP address entries 1245 that may store SLB identities 1250. The SLB identities 1250 may include data related to identities of one or more SLBs in communication with the GSLB site controller 210, such as the SLB 231 and the SLB 232.

The GSLB site controller 210 may further have health records 505. The health records 505 of the GSLB site controller 210 may include health records 725 that store SLB health status 725 of the SLB 231. The health records 505 of the GSLB site controller 210 may further include health records 905 that store SLB health status 1255 of the SLB 232. The health records 505 of the GSLB site controller 210 may further include health records 910 that may store health statuses of servers and SLBs associated with a remote GSLB site controller 405.

Upon receipt of the DNS request 1205, the GSLB site controller 210 may analyze health statuses of servers and SLBs stored in the health records 505 and select one of servers, shown as a DNS server 1260, for serving the DNS request 1205. The selection may be made based on predetermined criteria. More specifically, to perform the selection, the GSLB site controller 210 may match the domain name 1215 with the name list 1220. The GSLB site controller 210 may match the domain name 1215 with the previously configured (domain name, VIP address) pairs in the name list 1220 to determine one of the VIP addresses 1235 that matches the domain name 1215 in the name list 1220.

If the GSLB site controller 210 is in a DNS server mode, the GSLB site controller 210 matches the selected one of the VIP addresses 1235 with the previously configured (VIP address, SLB identity) pairs in the name entries 1225. In an example embodiment, if the GSLB site controller 210 is not in the DNS server mode, but is in a proxy mode, there are a number of backend DNS servers and the GSLB site controller 210 forwards the DNS request 1205 to one of the backend DNS servers. Upon receipt of the DNS response from the backend server, the GSLB site controller 210 performs matching of the VIP address received in the DNS response with the previously configured (VIP address, SLB identity) pairs in the name entries 1225 to determine the SLB identity corresponding to the VIP address (i.e., to determine the SLB that forwards communications to the VIP address of the DNS server 1260). Both in the DNS server mode and the proxy mode, upon matching with the previously configured (VIP address, SLB identity) pairs, the GSLB site controller 210 checks the health status of the SLB determined based on the determined SLB identity to determine whether the SLB is in 'active' mode. If the SLB is in 'active' mode, the GSLB site controller 210 may generate a response 1265, include the selected VIP address of the DNS server 1260 into the response 1265, and send the response 1265 to the DNS client 1212. The communications between the DNS client 1212 and the DNS server 1260 may be served by the selected SLB.

In an example embodiment, all GSLB site controllers, such as the GSLB site controller 210 and all remote GSLB site controllers, may be synchronized to have the same name entries 1225 and VIP addresses 1235.

Figure 13:
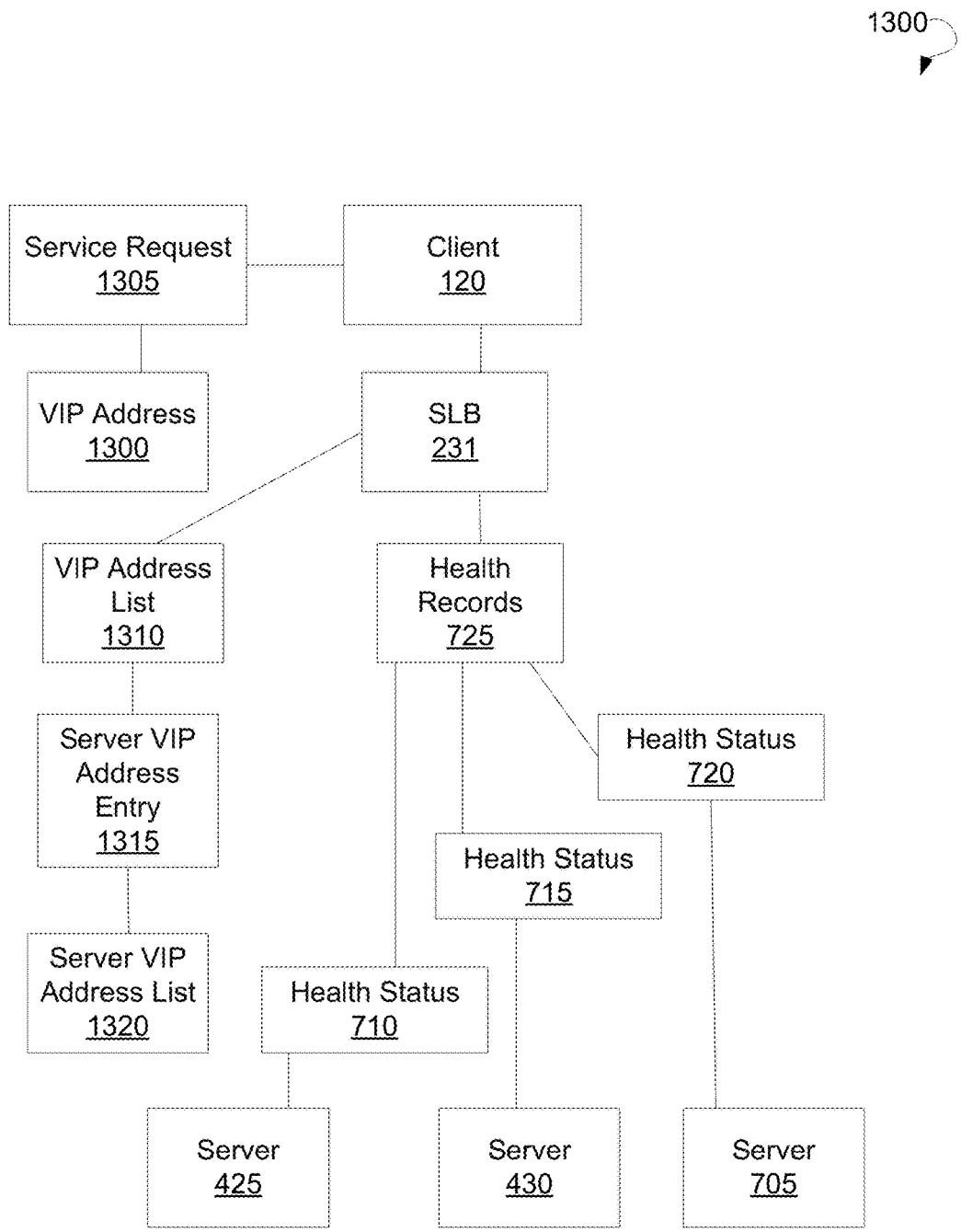
FIG. 13 is a block diagram that shows processing of a service request by an SLB, according to an example embodiment.

FIG. 13 is a block diagram 1300 that illustrates processing of a service request by an SLB, according to an example embodiment. The SLB 231 may receive a service request 1305 from a client 120. The service request 1305 may include a VIP address 1300 of a server to which the client 120 wants to connect.

The SLB 231 may have a VIP address list 1310 that may contain a plurality of server VIP address entries 1315. The server VIP address entries 1315 may include a server VIP address list 1320. The server VIP address list 1320 may include a plurality of VIP addresses of servers in communication with the SLB 231. In an example embodiment, the server VIP address list 1320 may include a plurality of VIP addresses of servers in communication with other SLBs, a GSLB site controller, a remote GSLB site controller, and so forth.

The SLB 231 may further store health records 725. The health records 725 may include health statuses 710, 715, and 720 of servers 425, 430, and 705, respectively. The servers 425, 430, and 705 may belong to a server pool in communication with the SLB 231.

Upon receipt of the service request 1305, the SLB 231 may analyze the health statuses 710, 715, and 720 in the health records 725 and select one of the servers 425, 430, and 705 for servicing the service request 1305. The selection may be made based on predetermined criteria. The SLB 231 may take data associated with the selected server from the server VIP address list 1320. The SLB 231 may forward the service request 1305 to the selected server.

Figure 14:
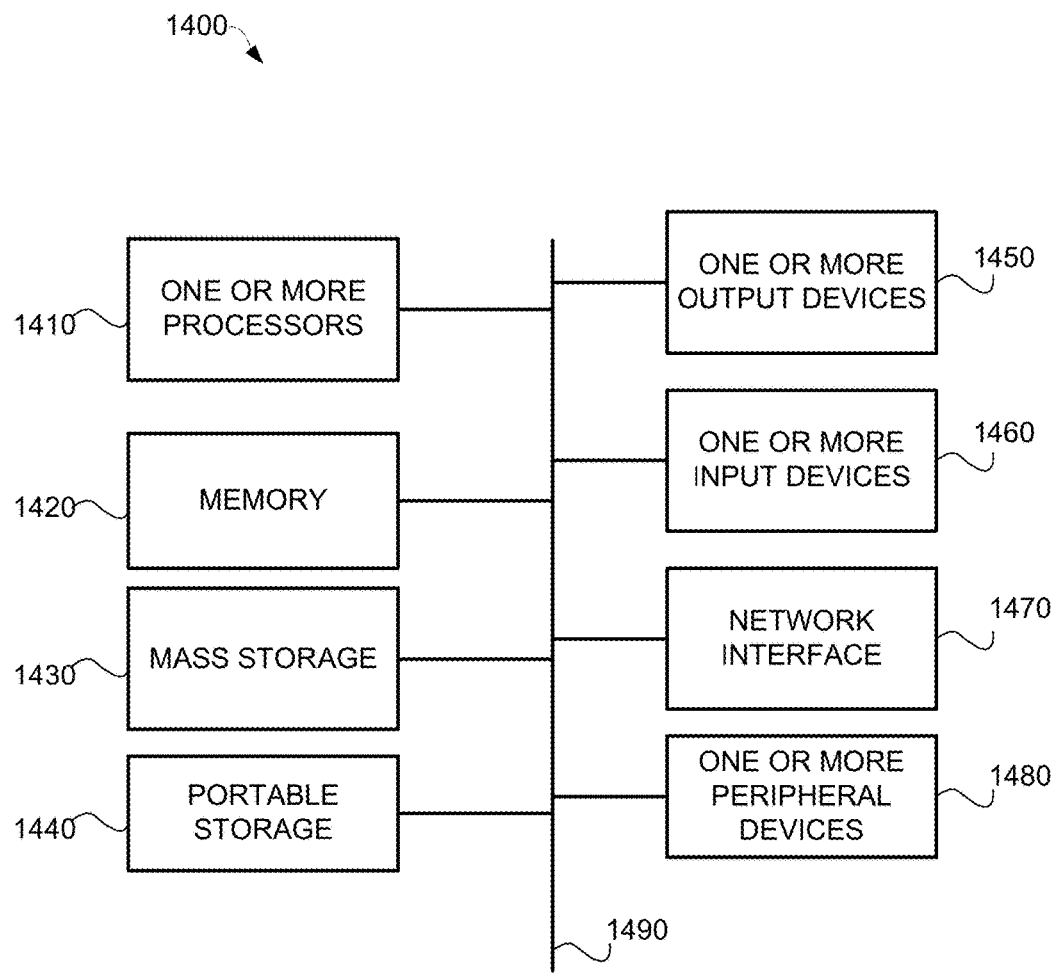
FIG. 14 is a computing system that can be used to implement a method for managing health statuses of servers in a distributed GSLB system, according to an example embodiment.

FIG. 14 illustrates an exemplary computing system 1400 that may be used to implement embodiments described herein. The exemplary computing system 1400 of FIG. 14 may include one or more processors 1410 and memory 1420. Memory 1420 may store, in part, instructions and data for execution by the one or more processors 1410. Memory 1420 can store the executable code when the exemplary computing 1400 is in operation. The exemplary computing system 1400 of FIG. 14 may further include a mass storage 1430, portable storage 1440, one or more output devices 1450, one or more input devices 1460, a network interface 1470, and one or more peripheral devices 1480.

The components shown in FIG. 14 are depicted as being connected via a single bus 1490. The components may be connected through one or more data transport means. The one or more processors 1410 and memory 1420 may be connected via a local microprocessor bus, and the mass storage 1430, one or more peripheral devices 1480, portable storage 1440, and network interface 1470 may be connected via one or more input/output buses.

Mass storage 1430, which may be implemented with a magnetic disk drive or an optical disk drive, is a non-volatile storage device for storing data and instructions for use by a magnetic disk or an optical disk drive, which in turn may be used by one or more processors 1410. Mass storage 1430 can store the system software for implementing embodiments described herein for purposes of loading that software into memory 1420.

Portable storage 1440 may operate in conjunction with a portable non-volatile storage medium, such as a compact disk (CD) or digital video disc (DVD), to input and output data and code to and from the computing system 1400 of FIG. 14. The system software for implementing embodiments described herein may be stored on such a portable medium and input to the computing system 1400 via the portable storage 1440.

One or more input devices 1460 provide a portion of a user interface. The one or more input devices 1460 may include an alphanumeric keypad, such as a keyboard, for inputting alphanumeric and other information, or a pointing device, such as a mouse, a trackball, a stylus, or cursor direction keys. Additionally, the computing system 1400 as shown in FIG. 14 includes one or more output devices 1450. Suitable one or more output devices 1450 include speakers, printers, network interfaces, and monitors.

Network interface 1470 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1470 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1480 may include any type of computer support device to add additional functionality to the computing system. The one or more peripheral devices 1480 may include a modem or a router.

The components contained in the exemplary computing system 1400 of FIG. 14 are those typically found in computing systems that may be suitable for use with embodiments described herein and are intended to represent a broad category of such computer components that are well known in the art. Thus, the exemplary computing system 1400 of FIG. 14 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for managing health statuses of servers are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for managing health statuses of servers, the system comprising:
    a global server load balancing (GSLB) site controller configured to:
        receive health statuses of local servers associated with the GSLB site controller;
        exchange the health statuses of the local servers with health statuses of remote servers associated with at least one remote GSLB site controller, wherein the health statuses of the servers include the health statuses of the local servers and the health statuses of the remote servers; and
        distribute at least a part of the health statuses of the local servers and the remote servers to server load balancers (SLBs) associated with the GSLB site controller, wherein the health statuses of the local servers and the health statuses of the remote servers include parameters of at least one of the following: a central processing unit utilization, Hypertext Transfer Protocol activities, a memory utilization, a disk usage, an application status, a virtual Internet Protocol (VIP) state, a connection load, a number of active backend servers, a session capacity, a session load, and active round delay time information; and
    a storage module configured to store at least the health statuses of the servers, wherein the health statuses of the servers are determined based on thresholds associated with the parameters, the health statuses of the servers are associated with a health status score determined for each of the health statuses of the servers, the health status score is determined based on weights assigned to each of the parameters, the health status score is determined using a weighted summation of the parameters, and the health status score falling below a predetermined value indicates a down status of one of the local servers and the remote servers.

2. The system of claim 1, wherein the health statuses of the servers are exchanged via a GSLB master.

3. The system of claim of claim 1, wherein the health statuses of the servers further include a health status of one of the SLBs or a health status of the GSLB site controller.

4. The system of claim 1, wherein the health statuses of the servers are collected based on a predetermined health collection policy.

5. The system of claim 1, wherein the health statuses of the servers are collected by respective SLBs.

6. The system of claim 1, wherein the health statuses of the local servers are reported directly to the GSLB site controller by the local servers associated with the GSLB site controller.

7. The system of claim 1, wherein the GSLB site controller is further configured to:
receive a Domain Name System (DNS) request;
determine one or more candidate servers selected from the local servers and the remote servers to answer the DNS request based on predetermined selection criteria; and
select a server from the one or more candidate servers to serve a DNS answer to the DNS request based on the health statuses of the one or more candidate servers distributed to the SLBs.

8. The system of claim 1, wherein the health statuses of the servers are determined based on responses to application requests sent by the SLBs to the servers.

9. A method for managing health statuses of servers in a distributed global server load balancing (GSLB) system, the method comprising:
receiving, at a GSLB site controller, health statuses of local servers associated with the GSLB site controller;
exchanging, by the GSLB site controller, the health statuses of the local servers with health statuses of remote servers associated with at least one remote GSLB site controller, wherein the health statuses of the servers include the health statuses of the local servers and the health statuses of the remote servers; and
distributing, by the GSLB site controller, at least a part of the health statuses of the local servers and the remote servers to server load balancers (SLBs) associated with the GSLB site controller, wherein the health statuses of the local servers and the health statuses of the remote servers include parameters including at least one of the following: a central processing unit utilization, Hypertext Transfer Protocol activities, a memory utilization, a disk usage, an application status, a virtual Internet Protocol (VIP) state, a connection load, a number of active backend servers, a session capacity, a session load, and active round delay time information,
wherein the health statuses of the servers are determined based on thresholds associated with the parameters, the health statuses of the servers are associated with a health status score determined for each of the health statuses of the servers, the health status score is determined using a weighted summation of the parameters, the health status score is determined based on weights assigned to each of the parameters, and the health status score falling below a predetermined value indicates a down status of one of the local servers and the remote servers.

10. The method of claim 9, wherein the health statuses of the servers are exchanged via a GSLB master.

11. The method of claim of claim 9, wherein the health statuses of the servers further include a health status of one of the SLBs or a health status of the GSLB site controller.

12. The method of claim 9, wherein the health statuses of the servers are collected based on a predetermined health collection policy by respective SLBs.

13. The method of claim 9, further comprising:
receiving a Domain Name System (DNS) request;
determining one or more candidate servers being selected from the local servers and the remote servers to answer the DNS request based on predetermined selection criteria; and
selecting a server from the one or more candidate servers to serve a DNS answer to the DNS request based on the health statuses of the one or more candidate servers distributed to the SLBs.

14. A system for managing health statuses of servers, the system comprising:
a global server load balancing (GSLB) site controller configured to:
receive health statuses of local servers associated with the GSLB site controller;
exchange the health statuses of the local servers with health statuses of remote servers associated with at least one remote GSLB site controller, wherein the health statuses of the servers include the health statuses of the local servers and the health statuses of the remote servers; and
distribute at least a part of the health statuses of the local servers and the remote servers to server load balancers (SLBs) associated with the GSLB site controller, wherein the health statuses of the local servers and the health statuses of the remote servers include parameters including at least one of the following: a central processing unit utilization, Hypertext Transfer Protocol activities, a memory utilization, a disk usage, an application status, a virtual Internet Protocol (VIP) state, a connection load, a number of active backend servers, a session capacity, a session load, and active round delay time information;
receive a Domain Name System (DNS) request;
determine one or more candidate servers being selected from the local servers and the remote servers to answer the DNS request based on predetermined selection criteria; and
select a server from the one or more candidate servers to serve a DNS answer to the DNS request based on the health statuses of the one or more candidate servers distributed to the SLBs; and
a storage module configured to store at least the health statuses of the servers, wherein the health statuses of the servers are determined based on thresholds associated with the parameters, the health statuses of the servers are associated with a health status score determined for each of the health statuses of the servers, the health status score is determined based on weights assigned to each of the parameters, the health status score is determined using a weighted summation of the parameters, and the health status score falling below a predetermined value indicates a down status of one of the local servers and the remote servers.

* * * * *